(12) United States Patent
Chung et al.

(10) Patent No.: US 8,921,480 B2
(45) Date of Patent: Dec. 30, 2014

(54) (METH)ACRYLIC-BASED FLAME RETARDANT COPOLYMER AND METHOD FOR MANUFACTURING THE SAME

(71) Applicant: Cheil Industries Inc., Gumi-si (KR)

(72) Inventors: Jin Hwa Chung, Uiwang-si (KR); Kee Hae Kwon, Uiwang-si (KR); Kwang Soo Park, Uiwang-si (KR); Ja Kwan Koo, Uiwang-si (KR); Man Suk Kim, Uiwang-si (KR); Yong Hee Kang, Uiwang-si (KR); Jin Seong Lee, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 13/872,240

(22) Filed: Apr. 29, 2013

(65) Prior Publication Data

US 2013/0234084 A1 Sep. 12, 2013

Related U.S. Application Data

(63) Continuation-in-part of application No. PCT/KR2010/009532, filed on Dec. 29, 2010.

(30) Foreign Application Priority Data

Nov. 5, 2010 (KR) .................. 10-2010-0109991

(51) Int. Cl.
*C08F 220/14* (2006.01)
*C09K 21/14* (2006.01)

(52) U.S. Cl.
CPC ............... *C09K 21/14* (2013.01); *C08F 220/14* (2013.01)
USPC ............... 524/556; 526/278; 252/609

(58) Field of Classification Search
CPC ............ C08F 220/14; C08F 2220/185; C08F 230/02; C09K 21/14
USPC ............... 524/556; 526/278; 252/609
See application file for complete search history.

(56) References Cited

U.S. PATENT DOCUMENTS

| 3,985,831 | A | * | 10/1976 | Boyer ........................ 524/405 |
| 4,409,350 | A | | 10/1983 | Fujiwara et al. |
| 5,773,533 | A | | 6/1998 | Horold |
| 2010/0240831 | A1 | | 9/2010 | Kim et al. |

FOREIGN PATENT DOCUMENTS

| EP | 0319971 | A2 | 6/1989 |
| KR | 10-1980-0001251 | B1 | 10/1980 |
| KR | 10-0885819 | B1 | 2/2009 |
| WO | 2012/060514 | A1 | 5/2012 |

OTHER PUBLICATIONS

International Search Report in counterpart International Application No. PCT/KR2010/009532 dated Dec. 19, 2011, pp. 1-2.

Price et al., "Flame retardance of poly(methyl methacrylate) modified with phosphorus-containing compounds", Polymer Degradation and Stability, vol. 77, (2002) pp. 227-233.

* cited by examiner

Primary Examiner — Michael M Bernshteyn
(74) Attorney, Agent, or Firm — Additon, Higgins & Pendleton, P.A.

(57) ABSTRACT

An eco-friendly (meth)acrylic flame retardant copolymer includes a phosphorous-based acrylic monomer to provide a high index of refraction and excellent flame retardancy.

14 Claims, No Drawings

(METH)ACRYLIC-BASED FLAME RETARDANT COPOLYMER AND METHOD FOR MANUFACTURING THE SAME

CROSS-REFERENCE TO RELATED APPLICATIONS

This application is a continuation-in-part of International Application No. PCT/KR2010/009532 filed on Dec. 29, 2010, which designates the U.S., published as WO 2012/060514, and is incorporated herein by reference in its entirety, and claims priority therefrom under 35 USC Section 120. This application also claims priority under 35 USC Section 119 to and the benefit of Korean Patent Application No. 10-2010-0109991 filed on Nov. 5, 2010, the entire disclosure of which is incorporated herein by reference.

FIELD OF THE INVENTION

The present invention relates to a (meth)acrylic flame retardant copolymer and a method for manufacturing the same.

BACKGROUND OF THE INVENTION

Recently, there has been an increasing demand for exterior materials for electric and electronic products or automobiles having high functionality and high performance. In particular, there is increasing demand for exterior materials that ensure flame retardancy together with good scratch resistance and pleasant tactile texture.

As commercially available resins capable of exhibiting scratch resistance, acrylic resins, specifically polymethyl methacrylate (PMMA) resins, have excellent transparency, weather resistance, mechanical strength, surface gloss, adhesion, and the like. However, acrylic resins have drawbacks in that impact resistance and flame retardancy are very poor.

In order to achieve both scratch resistance and flame retardancy, it is proposed to add a flame retardant to impose flame retardancy in preparation of polymethyl methacrylate (PMMA) resins having good scratch resistance of a pencil hardness level of 3H to 4H. In this case, however, it is necessary to add a large amount of flame retardant. As a result, the flame retardant monomer can escape from the resins, which can cause environmental problems and deterioration in mechanical properties of the resin.

In addition, the acrylic resin, specifically a polymethyl methacrylate (PMMA) resin, can be mixed with a polycarbonate resin exhibiting good mechanical strength and flame retardancy to provide good scratch resistance and flame retardancy. However, due to high index of refraction of the polycarbonate resin, the polymethyl methacrylate resin can suffer from deterioration in transparency and colorability when mixed with the polycarbonate resin. Moreover, in order to have good compatibility with the polycarbonate resin, the acrylic resin is required to have a high index of refraction.

SUMMARY OF THE INVENTION

The present invention provides a (meth)acrylic flame retardant copolymer that can have a high index of refraction and excellent flame retardancy.

The present invention further provides an environmentally friendly (meth)acrylic flame retardant copolymer.

In addition, the present invention provides a (meth)acrylic flame retardant copolymer capable of minimizing deterioration in transparency and colorability when mixed with a resin having a high index of refraction.

The (meth)acrylic flame retardant copolymer may include a phosphorus-based acrylic monomer and have an index of refraction from about 1.490 to about 1.590.

In one embodiment, the phosphorus-based acrylic monomer may be represented by Formula 1:

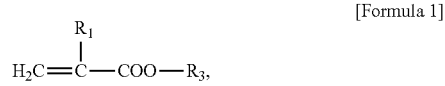

[Formula 1]

wherein $R_1$ is —H or —$(CH_2)_n$-$CH_3$, n is an integer from 0 to 5, and $R_3$ is

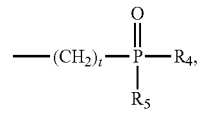

wherein t is an integer from 1 to 10, $R_4$ and $R_5$ are the same or different and are each independently —$O(CH_2)_q X$, q is an integer from 0 to 3, and X is methyl, cyclohexyl, phenyl, methylphenyl, methylethylphenyl, propylphenyl, methoxyphenyl, cyclohexylphenyl, chlorophenyl, bromophenyl, phenylphenyl, or benzylphenyl.

In one embodiment, the (meth)acrylic flame retardant copolymer may further include a (meth)acrylic monomer having an index of refraction from about 1.4950 to about 1.6500; and a reactive unsaturated monomer.

In one embodiment, the (meth)acrylic monomer having an index of refraction from about 1.4950 to about 1.6500 may have a structure represented by Formula 2 and/or Formula 3:

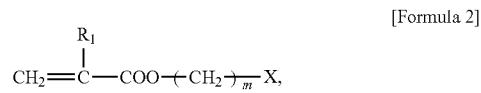

[Formula 2]

wherein $R_1$ is —H or —$(CH_2)_n$-$CH_3$, n is an integer from 0 to 5, m is an integer from 0 to 10, and X is methyl, cyclohexyl, phenyl, methylphenyl, methylethylphenyl, methoxyphenyl, propylphenyl, cyclohexylphenyl, chlorophenyl, bromophenyl, phenylphenyl or benzylphenyl,

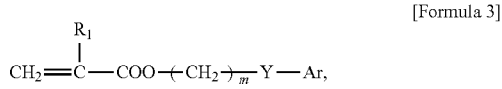

[Formula 3]

wherein $R_1$ is —H or —$(CH_2)_n$-$CH_3$, n is an integer from 0 to 5, m is an integer from 0 to 10, Y is oxygen or sulfur, and Ar is cyclohexyl, phenyl, methylphenyl, methylethylphenyl, methoxyphenyl, cyclohexylphenyl, chlorophenyl, bromophenyl, phenylphenyl or benzylphenyl.

In one embodiment, the reactive unsaturated monomer may include at least one selected from the group consisting of (meth)acrylic acid esters, unsaturated carboxylic acids, unsaturated carboxylic acid anhydrides, acid anhydrides, unsaturated carboxylic acid esters containing hydroxyl group, unsaturated carboxylic acid amides, and combinations thereof.

In one embodiment, the (meth)acrylic flame retardant copolymer may include about 1% by weight (wt %) to about 50 wt % of the phosphorus-based acrylic monomer; about 1 wt % to about 99 wt % of (meth)acrylic monomer having an index of refraction from about 1.4950 to about 1.6500; and about 0 wt % to about 98 wt % of the reactive unsaturated monomer.

In one embodiment, the (meth)acrylic flame retardant copolymer may have a flame retardancy of V2 or more, as measured on a 3.2 mm thick specimen in accordance with UL94.

In one embodiment, the (meth)acrylic flame retardant copolymer may have a total light transmittance of about 85% or more, as evaluated on a 2.5 mm thick specimen in accordance with ASTM D1003.

In one embodiment, the (meth)acrylic flame retardant copolymer may have a weight average molecular weight of about 5,000 g/mol to about 500,000 g/mol.

The present invention further provides a resin composition including the (meth)acrylic flame retardant copolymer.

The present invention may provide an acrylic copolymer having a high index of refraction and excellent flame retardancy. In addition, the present invention may provide an eco-friendly flame retardant acrylic copolymer that can prevent leakage of a flame retardant. Further, the present invention may provide a (meth)acrylic flame retardant copolymer capable of minimizing deterioration in transparency and colorability when mixed with a resin having a high index of refraction, such as polycarbonate or the like.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

The (meth)acrylic flame retardant copolymer may have an index of refraction ranging from about 1.490 to about 1.590. The index of refraction of the copolymer may be measured, for example, on a 2.5 mm thick specimen and may range from about 1.490 to about 1.590. The flame retardant copolymer includes a phosphorus-based acrylic monomer described hereinafter.

The phosphorus-based acrylic monomer may have a structure represented by Formula 1:

[Formula 1]

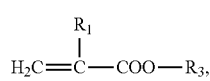

wherein $R_1$ is —H or —$(CH_2)_n$-$CH_3$, n is an integer from 0 to 5, and $R_3$ is

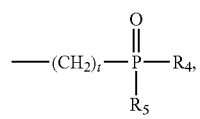

wherein t is an integer from 1 to 10, $R_4$ and $R_5$ are the same or different and are each independently —$O(CH_2)_qX$, q is an integer from 0 to 3, and X is methyl, cyclohexyl, phenyl, methylphenyl, methylethylphenyl, propylphenyl, methoxyphenyl, cyclohexylphenyl, chlorophenyl, bromophenyl, phenylphenyl or benzylphenyl.

Examples of the phosphorus-based acrylic monomer may include without limitation dimethyl(methacryloyloxymethyl)phosphonate, dimethyl(acryloyloxymethyl)phosphonate, methylethyl(methacryloyloxymethyl)phosphonate, methylethyl(acryloyloxymethyl)phosphonate, dimethyl(methacryloyloxyethyl)phosphonate, diethyl(methacryloyloxymethyl)phosphonate, diethyl(acryloyloxymethyl)phosphonate, diethyl(methacryloyloxyethyl)phosphonate, dipropyl(methacryloyloxymethyl)phosphonate, dipropyl(methacryloyloxyethyl)phosphonate, and the like, and combinations thereof.

The (meth)acrylic flame retardant copolymer may include the phosphorus-based acrylic monomer in an amount of about 1 wt % to about 50 wt %, for example about 5 wt % to about 50 wt %, and as another example about 10 wt % to about 30 wt %, based on the total weight (100 wt %) of the (meth)acrylic flame retardant copolymer. In some embodiments, the (meth)acrylic flame retardant copolymer may include the phosphorus-based acrylic monomer in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt %. Further, according to some embodiments of the present invention, the amount of the phosphorus-based acrylic monomer can be in a range from about any of the foregoing amounts to about any other of the foregoing amounts.

When the (meth)acrylic flame retardant copolymer includes the phosphorus-based acrylic monomer in an amount within this range, the (meth)acrylic flame retardant copolymer can exhibit flame retardancy without deterioration in compatibility with polycarbonate.

In addition to the phosphorus-based acrylic monomer, the (meth)acrylic flame retardant copolymer may further include a (meth)acrylic monomer having an index of refraction from about 1.4950 to about 1.6500 and/or a reactive unsaturated monomer.

(Meth)Acrylic Monomer Having an Index of Refraction from about 1.4950 to about 1.6500

The (meth)acrylic monomer may have an index of refraction ranging from about 1.4950 to about 1.6500. The index of refraction of the monomer may be measured, for example, on a 2.5 mm thick specimen and may range from about 1.4950 to about 1.6500, for example from about 1.4950 to about 1.5900. Within this range, the (meth)acrylic copolymer resin has improved index of refraction and thus can exhibit good compatibility with the polycarbonate resin having a high index of refraction.

The (meth)acrylic monomer may have a structure represented by Formula 2 and/or Formula 3:

[Formula 2]

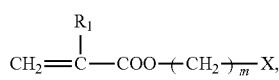

wherein $R_1$ is —H or —$(CH_2)_n$-$CH_3$, n is an integer from 0 to 5, m is an integer from 0 to 10, and X is methyl, cyclohexyl, phenyl, methylphenyl, methylethylphenyl, methoxyphenyl, propylphenyl, cyclohexylphenyl, chlorophenyl, bromophenyl, phenylphenyl or benzylphenyl,

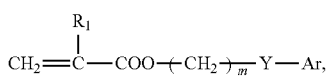

[Formula 3]

wherein $R_1$ is —H or —$(CH_2)n$-$CH_3$, n is an integer from 0 to 5, m is an integer from 0 to 10, Y is oxygen or sulfur, and Ar is cyclohexyl, phenyl, methylphenyl, methylethylphenyl, methoxyphenyl, cyclohexylphenyl, chlorophenyl, bromophenyl, phenylphenyl or benzylphenyl.

Examples of the (meth)acrylic monomer may include without limitation cyclohexyl(meth)acrylate, phenoxy(meth)acrylate, 2-ethylphenoxy(meth)acrylate, benzyl(meth)acrylate, phenyl(meth)acrylate, 2-ethylthiophenyl(meth)acrylate, 2-phenylethyl(meth)acrylate, 2-phenylpropyl(meth)acrylate, 3-phenylpropyl(meth)acrylate, 4-phenylbutyl(meth)acrylate, 2-2-methylphenylethyl(meth)acrylate, 2-3-methylphenylethyl(meth)acrylate, 2-4-methylphenylethyl(meth)acrylate, 2-(4-propylphenyl)ethyl(meth)acrylate, 2-(4-(1-methylethyl)phenyl)ethyl(meth)acrylate, 2-(4-methoxyphenyl)ethyl(meth)acrylate, 2-(4-cyclohexylphenyl)ethyl(meth)acrylate, 2-(2-chlorophenyl)ethyl(meth)acrylate, 2-(3-chlorophenyl)ethyl(meth)acrylate, 2-(4-chlorophenyl)ethyl(meth)acrylate, 2-(4-bromophenyl)ethyl(meth)acrylate, 2-(3-phenylphenyl)ethyl(meth)acrylate, 2-(4-benzylphenyl)ethyl(meth)acrylate, and the like, and combinations thereof.

The (meth)acrylic flame retardant copolymer may include the (meth)acrylic monomer in an amount of about 1 wt % to about 99 wt %, for example about 15 wt % to about 40 wt %, and as another example about 20 wt % to about 30 wt %, based on the total weight (100 wt %) of the (meth)acrylic flame retardant copolymer. In some embodiments, the (meth)acrylic flame retardant copolymer may include the (meth)acrylic monomer in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 wt %. Further, according to some embodiments of the present invention, the amount of the (meth)acrylic monomer can be in a range from about any of the foregoing amounts to about any other of the foregoing amounts.

When the (meth)acrylic flame retardant copolymer includes the (meth)acrylic monomer in an amount within this range, the (meth)acrylic flame retardant copolymer can have improved index of refraction and thus can exhibit good compatibility with the polycarbonate resin having a high index of refraction.

Reactive Unsaturated Monomer

The reactive unsaturated monomer may be a monofunctional unsaturated monomer, without being limited thereto. Examples of the reactive unsaturated monomer may include without limitation (meth)acrylic acid esters, unsaturated carboxylic acids, unsaturated carboxylic acid anhydrides, acid anhydrides, unsaturated carboxylic acid esters containing hydroxyl group, unsaturated carboxylic acid amides, and the like, and combinations thereof.

Examples of the acrylic acid esters may include without limitation methyl acrylate, ethyl acrylate, propyl acrylate, butyl acrylate, 2-ethylhexyl acrylate, and the like, and combinations thereof. Examples of the methacrylic acid esters may include without limitation methyl methacrylate, ethyl methacrylate, propyl methacrylate, butyl methacrylate, benzyl methacrylate, and the like, and combinations thereof. Examples of the unsaturated carboxylic acids may include without limitation acrylic acid, methacrylic acid, and the like, and combinations thereof. Examples of the unsaturated carboxylic acid anhydrides may include without limitation maleic anhydride. Examples of the unsaturated carboxylic acid esters containing hydroxyl group may include without limitation 2-hydroxyethyl acrylate, 2-hydroxypropyl acrylate, monoglycerol acrylate, and the like, and combinations thereof. Examples of the unsaturated carboxylic acid amides may include without limitation acrylic amide, methacrylic amide, and the like, and combinations thereof.

The (meth)acrylic flame retardant copolymer may include the reactive unsaturated monomer in an amount of about 0 wt % to about 98 wt %, for example about 10 wt % to about 80 wt %, and as another example about 40 wt % to about 70 wt %, based on the total weight (wt %) of the (meth)acrylic flame retardant copolymer. In some embodiments, the (meth)acrylic flame retardant copolymer may include the reactive unsaturated monomer in an amount of 0 (the reactive unsaturated monomer is not present), about 0 (the reactive unsaturated monomer is present), 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, or 98 wt %. Further, according to some embodiments of the present invention, the amount of the reactive unsaturated monomer can be in a range from about any of the foregoing amounts to about any other of the foregoing amounts.

As used herein, the term "about 0 wt %" includes embodiments in which the copolymer does not include the reactive unsaturated monomer (i.e., the reactive unsaturated monomer is not present) and also embodiments in which the copolymer does include the reactive unsaturated monomer (i.e., the reactive unsaturated monomer is present).

The (meth)acrylic flame retardant copolymer may include about 1 wt % to about 50 wt % of the phosphorus-based acrylic monomer; about 1 wt % to about 99 wt % of the (meth)acrylic monomer having an index of refraction from about 1.4950 to about 1.6500; and about 0 wt % to about 98 wt % of the reactive unsaturated monomer, wherein each amount is based on the total weight (100 wt %) of the (meth)acrylic flame retardant copolymer. For example, the (meth)acrylic flame retardant copolymer may include about 5 wt % to about 50 wt % of the phosphorus-based acrylic monomer; about 15 wt % to about 40 wt % of the (meth)acrylic monomer having an index of refraction from about 1.4950 to about 1.6500; and about 10 wt % to about 80 wt % of the reactive unsaturated monomer. As another example, the (meth)acrylic flame retardant copolymer may include about 10 wt % to about 30 wt % of the phosphorus-based acrylic monomer; about 20 wt % to about 30 wt % of the (meth)acrylic monomer having an index of refraction from about 1.4950 to about 1.6500; and about 40 wt % to about 70 wt % of the reactive unsaturated monomer.

A composition including the (meth)acrylic flame retardant copolymer of the invention may further include one or more additives. Examples of the additives may include without limitation flame retardants, surfactants, nucleating agents, coupling agents, fillers, plasticizers, impact modifiers, lubricants, antibacterial agents, release agents, heat stabilizers, antioxidants, light stabilizers, inorganic additives, colorants, stabilizers, lubricating agents, antistatic agents, pigments, dyes, fire-proofing agents, and the like, and mixtures thereof.

The (meth)acrylic flame retardant copolymer may have a weight average molecular weight from about 5,000 g/mol to about 500,000 g/mol, for example, a weight average molecular weight from about 5,000 g/mol to about 150,000 g/mol. When the (meth)acrylic flame retardant copolymer has a weight average molecular weight within this range, the (meth)acrylic flame retardant copolymer can maintain both compatibility and mechanical properties.

The (meth)acrylic flame retardant copolymer may have an index of refraction from about 1.490 to about 1.590, as measured on a 2.5 mm thick specimen. Further, the flame retardant copolymer may have a flame retardancy of V2 or more, as measured on a 3.2 mm thick specimen in accordance with UL94, for example V2 to V0. Further, the flame retardant copolymer can have total light transmittance of about 85% or more, as evaluated on a 2.5 mm thick specimen in accordance with ASTM D1003.

Preparation Method of (Meth)Acrylic Flame Retardant Copolymer

The (meth)acrylic flame retardant copolymer may be prepared by any typical polymerization process known in the art, such as bulk polymerization, emulsion polymerization, or suspension polymerization, without being limited thereto. In exemplary embodiments, the (meth)acrylic flame retardant copolymer is prepared by suspension polymerization.

Specifically, the method of preparing the (meth)acrylic flame retardant copolymer may include polymerizing a monomer mixture of a phosphorus-based acrylic monomer; a (meth)acrylic monomer having an index of refraction from about 1.4950 to about 1.6500; and a reactive unsaturated monomer.

For example, the method may include polymerizing a monomer mixture which includes about 5 wt % to about 50 wt % of the phosphorus-based acrylic monomer; about 15 wt % to about 40 wt % of the (meth)acrylic monomer having an index of refraction from about 1.4950 to about 1.6500; and about 10 wt % to about 80 wt % of the reactive unsaturated monomer.

The temperature and duration of polymerization may be suitably adjusted. For example, polymerization may be performed at a temperature of about 65° C. to about 125° C., for example about 70° C. to about 120° C., for about 2 to about 8 hours.

Polymerization may be carried out in the presence of a polymerization initiator and a chain transfer agent.

The polymerization initiator may be any polymerization initiator known in the art. Examples of the polymerization initiator may include without limitation octanoyl peroxide, decanoyl peroxide, lauroyl peroxide, benzoyl peroxide, monochlorobenzoyl peroxide, dichlorobenzoyl peroxide, p-methylbenzoyl peroxide, tert-butyl perbenzoate, azobisisobutyronitrile, azobis-(2,4-dimethyl)-valeronitrile, and the like, and combinations thereof. The polymerization initiator may be present in an amount of about 0.01 parts by weight to about 10 parts by weight based on about 100 parts by weight of the monomer mixture.

A chain transfer agent may be used to adjust the weight average molecular weight and improve heat stability of the (meth)acrylic flame retardant copolymer. The weight average molecular weight of the copolymer may be adjusted by the amount of the polymerization initiator included in the monomer mixture. However, when the polymerization reaction is stopped by the chain transfer agent, the end of the chain may have a second carbon structure. This allows the chain end to have stronger binding strength than that of the chain end having double bonds formed when a chain transfer agent is not employed. Accordingly, the addition of the chain transfer agent can improve heat stability, thereby enhancing optical properties of the flame retardant acrylic copolymer.

The chain transfer agent may be any typical chain transfer agent known in the art. Examples of the chain transfer agent may include without limitation alkyl mercaptans represented by $CH_3(CH_2)nSH$ (wherein n is an integer from 1 to 20) including n-butyl mercaptan, n-octyl mercaptan, n-dodecyl mercaptan, tert-dodecyl mercaptan, isopropyl mercaptan, n-amyl mercaptan, and the like; halogen compounds including carbon tetrachloride, and the like; and aromatic compounds including alpha methylstyrene dimer or alpha ethylstyrene dimmer, and the like, and combinations thereof.

The chain transfer agent may be present in an amount of about 0.02 parts by weight to about 10 parts by weight based on about 100 parts by weight of the monomer mixture. When the amount of the chain transfer agent is less than about 0.02 parts by weight, the copolymer can exhibit deteriorated heat resistance due to thermal degradation. When the amount of the chain transfer agent is greater than about 10 parts by weight, the copolymer can be reduced in weight average molecular weight, thereby deteriorating mechanical properties.

The monomer mixture may further include at least one or more additives. Examples of the additives may include without limitation suspension stabilizers, suspension stabilization aids, flame retardants, surfactants, nucleating agents, coupling agents, fillers, plasticizers, impact modifiers, lubricants, antibacterial agents, release agents, heat stabilizers, antioxidants, light stabilizers, compatibilizers, inorganic additives, colorants, stabilizers, lubricating agents, antistatic agents, pigments, dyes, flame-proofing agents, and the like, and combinations thereof. The additives may be present in an amount of about 0.001 parts by weight to about 20 parts by weight based on about 100 parts by weight of the monomer mixture, without being limited thereto.

Examples of the suspension stabilizers may include without limitation organic suspension stabilizers including polyalkylacrylate-acrylic acid, polyolefin-maleic acid, polyvinyl alcohol, cellulose, and the like; inorganic suspension stabilizers including tricalcium phosphate and the like; and the like, and mixtures thereof.

Examples of the suspension stabilization aids may include without limitation disodium hydrogen phosphate, sodium dihydrogen phosphate, and the like, and combinations thereof. Sodium sulfate and the like may be added in order to control solubility of water soluble polymers or monomers.

Examples of the antioxidants may include without limitation octadecyl 3-(3,5-di-tert-butyl-4-hydroxyphenyl)propionate, triethylene glycol-bis-3 (3-tert-butyl-4-hydroxy-5-methylphenyl)propionate, 2,6-di-tert-butyl-4-methyl phenol, 2,2'-methylenebis(4-methyl-6-tert-butylphenol), tri(2,4-di-tert-butylphenyl)phosphite, n-octadecyl-3(3,5-di-tert-butyl-4-hydroxyphenyl)propionate, 1,3,5-tri(3,5-di-tert-butyl-4-hydroxybenzyl)isocyanurate, methyl 3-(3,5-di-tert-butyl-4-hydroxyphenyl)propionate, distearyl thio dipropionate, lauryl thio propionate, di-phenyl-isooctyl phosphite, and the like, and combinations thereof.

After completing polymerization, the resulting copolymer may be subjected to cooling, washing, dehydration, and drying procedures to obtain a copolymer in the form of pellets. The obtained copolymer may be pelletized through extrusion. Extrusion may be carried out by any typical method known in the art. In addition, in extrusion, at least one or more additives may be added to the flame retardant acrylic copolymer and then subjected to extrusion. Examples of the additives may include without limitation flame retardants, surfactants, nucleating agents, coupling agents, fillers, plasticizers, impact modifiers, lubricants, antibacterial agents, release agents, heat stabilizers, antioxidants, light stabilizers, compatibilizers, inorganic additives, colorants, stabilizers, lubricating agents, antistatic agents, pigments, dyes, flame-proofing agents, and the like, and combinations thereof.

Resin Composition

The present invention provides a resin composition including the (meth)acrylic flame retardant copolymer. The resin composition may include the (meth)acrylic flame retardant copolymer and any commercially available resin. For example, the resin composition may include polycarbonate, polyethylene, polystyrene resins, and the like, and combinations thereof, without being limited thereto.

Molded Article

The present invention provides a molded article prepared from the resin composition. Examples of molding methods include extrusion, injection molding or casting and the like, without being limited thereto. These molding methods are well known to those skilled in the art. The molded article may include various plastic products.

Next, the present invention will be described in more detail with reference to the following examples and comparative examples. It should be understood that these examples are provided for illustration only and are not to be construed in any way as limiting the scope of the invention.

Descriptions of details apparent to those skilled in the art will be omitted.

EXAMPLES

Example 1

0.3 parts by weight of n-mercaptan is added to a monomer mixture comprising 30 parts by weight of benzyl methacrylate (index of refraction: 1.5000), 10 parts by weight of dimethyl (methacryloyloxymethyl)phosphonate, 57.5 parts by weight of methyl methacrylate and 2.5 parts by weight of methyl acrylate to obtain a uniform monomer mixture. In a stainless steel high pressure reactor provided with a stirrer, small amounts of disodium hydrogen phosphate, sodium sulfate, and the like are dissolved in 130 parts by weight of ion exchange water, and 0.15 parts by weight of polyethyl acrylate-methacrylic acid (Mw: 1,000,000 or more) is added to the resultant, followed by stirring. The prepared monomer mixture is added to the prepared solution, followed by filling the reactor with an inert gas including nitrogen while stirring the solution. Polymerization is carried out at 72° C. for 3 hours and at 110° C. for 2 hours. After completion of the polymerization, the resultant product is subjected to washing, dehydration and drying, thereby preparing a copolymer in the form of pellets. The prepared copolymer has a weight average molecular weight of 80,000 g/mol.

Examples 2-7 and Comparative Examples 1-3

Acrylic copolymers are obtained in the same manner as in Example 1 except that benzyl methacrylate, phenyl methacrylate (index of refraction: 1.5000), dimethyl(methacryloyloxymethyl)phosphonate, diethyl(methacryloyloxymethyl) phosphonate, methyl methacrylate, and methyl acrylate are used in amounts as listed in the following Table 1.

0.1 parts by weight of a hindered phenol-based heat stabilizer is added to the prepared acrylic copolymer, followed by melting, kneading and extrusion, thereby preparing pellets. Here, extrusion is performed using a twin-screw extruder (L/D=29, Diameter: 45 mm), and the prepared pellets are dried at 80° C. for 6 hours and subjected to extrusion through a 6 Oz extruder, thereby preparing specimens. The prepared specimens are evaluated as to the index of refraction, flame retardancy, haze, and total light transmittance. Evaluation methods are described below. Evaluation results are shown in Table 1.

Evaluation Method

1. Weight average molecular weight (g/mol): The weight average molecular weight of each prepared acrylic copolymer is measured by Gel Permeation Chromatography (GPC).

2. Index of refraction: The index of refraction is measured on a 2.5 mm thick specimen at 20° C. using a refractometer DR-A1 (ATAGO Co., Ltd).

3. Flame retardancy: Flame retardancy is measured on a 3.2 mm thick specimen in accordance with UL 94 vertical test.

4. Haze (%) and Total light transmittance (%): Transparency of an acrylic resin can be evaluated by haze and total light transmittance of an injection-molded article. A higher total light transmittance (TT) and lower haze are evaluated as higher transmittance of the resin.

Total light transmittance (TT) of each 2.5 mm thick specimen is measured using a hazemeter NDH 2000 (Nippon Denshoku Co. Ltd.) in accordance with ASTM D1003. The total light transmittance is calculated from the total sum of diffused light transmittance (DF) and parallel light transmittance (PT). A higher total light transmittance (TT) is evaluated as higher transparency. The haze can be calculated by the following Equation:

$$\text{Haze value } (\%) = \frac{\text{Diffused light transmittance } (DF)}{\text{Parallel light transmittance } (PT)}.$$

TABLE 1

| | Kind | Example | | | | | | | Comparative Example | | |
| --- | --- | --- | --- | --- | --- | --- | --- | --- | --- | --- | --- |
| | | 1 | 2 | 3 | 4 | 5 | 6 | 7 | 1 | 2 | 3 |
| Monomer | Benzyl methacrylate | 30 | — | — | 30 | — | — | — | — | 30 | — |
| | Phenyl methacrylate | — | 20 | 30 | — | 30 | 30 | 30 | — | — | 30 |
| | Dimethyl(methacryloyloxymethyl)phosphonate | 10 | 20 | 10 | — | — | 30 | — | — | — | — |
| | Diethyl(methacryloyloxymethyl)phosphonate | — | — | — | 10 | 10 | — | 30 | — | — | — |
| | Methyl | 57.5 | 57.5 | 57.5 | 57.5 | 57.5 | 37.5 | 37.5 | 97.5 | 67.5 | 67.5 |

TABLE 1-continued

| | Kind | Example 1 | Example 2 | Example 3 | Example 4 | Example 5 | Example 6 | Example 7 | Comparative Example 1 | Comparative Example 2 | Comparative Example 3 |
|---|---|---|---|---|---|---|---|---|---|---|---|
| | methacrylate | | | | | | | | | | |
| | Methyl acrylate | 2.5 | 2.5 | 2.5 | 2.5 | 2.5 | 2.5 | 2.5 | 2.5 | 2.5 | 2.5 |
| Property | Mw (g/mol) (×1000) | 80 | 120 | 125 | 120 | 135 | 220 | 55 | 130 | 120 | 120 |
| | Index of refraction | 1.4925 | 1.5009 | 1.5085 | 1.4921 | 1.5083 | 1.4996 | 1.4990 | 1.4890 | 1.4970 | 1.5131 |
| | Flame retardancy (3.2 mm) | V2 | V2 | V2 | V2 | V2 | V0 | V0 | Fail | Fail | Fail |
| | Haze (%) (2.5 mm) | 1.7 | 1.2 | 1.5 | 1.6 | 1.5 | 1.1 | 1.3 | 1.0 | 1.2 | 1.2 |
| | Total light transmittance (%) (2.5 mm) | 91.7 | 91.3 | 91.3 | 91.5 | 91.6 | 91.2 | 91.9 | 92.0 | 91.6 | 91.9 |

As shown in Table 1, it can be seen that the flame retardant copolymers of the invention have higher indices of refraction and higher transparency than the acrylic copolymers not containing the phosphorus-based acrylic monomer (see Examples 1 to 7 and Comparative Examples 1 to 3). In addition, the flame retardant copolymers of the invention can have excellent flame retardancy as compared to acrylic copolymers not containing the phosphorus-based acrylic monomer (see Examples 1 to 7 and Comparative Examples 1 to 3)

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

That which is claimed is:

1. A (meth)acrylic flame retardant copolymer comprising a phosphorus-based acrylic monomer and having an index of refraction of about 1.490 to about 1.590, wherein the phosphorus-based acrylic monomer has a structure represented by Formula 1:

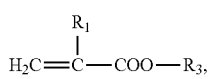

[Formula 1]

wherein $R_1$ is —H or —$(CH_2)$n-$CH_3$, n is an integer from 0 to 5, and $R_3$ is

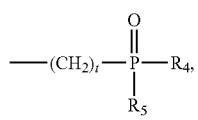

wherein t is an integer from 1 to 10, $R_4$ and $R_5$ are the same or different and are each independently —$O(CH_2)_q$X, q is an integer from 0 to 3, and X is methyl, cyclohexyl, phenyl, methylphenyl, methylethylphenyl, propylphenyl, methoxyphenyl, cyclohexylphenyl, chlorophenol, bromophenyl, phenylphenyl or benzylphenyl.

2. The (meth)acrylic flame retardant copolymer according to claim 1, further comprising: a (meth)acrylic monomer having an index of refraction from about 1.4950 to about 1.6500; and a reactive unsaturated monomer.

3. The (meth)acrylic flame retardant copolymer according to claim 2, wherein the (meth)acrylic monomer has a structure represented by Formula 2, a structure represented by Formula 3, or a combination thereof:

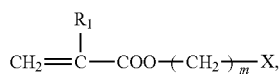

[Formula 2]

wherein $R_1$ is —H or —$(CH_2)$n-$CH_3$, n is an integer from 0 to 5, m is an integer from 0 to 10, and X is cyclohexyl, phenyl, methylphenyl, methylethylphenyl, methoxyphenyl, propylphenyl, cyclohexylphenyl, chlorophenyl, bromophenyl, phenylphenyl or benzylphenyl,

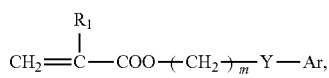

[Formula 3]

wherein $R_1$ is —H or —$(CH_2)$n-$CH_3$, n is an integer from 0 to 5, m is an integer from 0 to 10, Y is oxygen or sulfur, and Ar is cyclohexyl, phenyl, methylphenyl, methylethylphenyl, methoxyphenyl, cyclohexylphenyl, chlorophenyl, bromophenyl, phenylphenyl or benzylphenyl.

4. The (meth)acrylic flame retardant copolymer according to claim 2, wherein the reactive unsaturated monomer comprises a (meth)acrylic acid ester, unsaturated carboxylic acid, unsaturated carboxylic acid anhydride, acid anhydride, unsaturated carboxylic acid ester containing hydroxyl group, unsaturated carboxylic acid amide or a combination thereof.

5. The (meth)acrylic flame retardant copolymer according to claim 4, wherein the acrylic acid ester includes methyl acrylate, ethyl acrylate, propyl acrylate, butyl acrylate, 2-ethylhexyl acrylate, or a combination thereof; the methacrylic acid ester includes methyl methacrylate, ethyl methacrylate, propyl methacrylate, butyl methacrylate, benzyl methacrylate or a combination thereof; the unsaturated carboxylic acid includes acrylic, acid methacrylic acid or a combination thereof the unsaturated carboxylic acid anhydride includes maleic anhydride; the unsaturated carboxylic acid ester containing hydroxyl group includes 2-hydroxyethyl acrylate, 2-hydroxypropyl acrylate, monoglycerol acrylate or a combination thereof and the unsaturated carboxylic acid amide includes acrylic amide, methacrylic amide or a combination thereof.

6. The (meth)acrylic flame retardant copolymer according to claim 2, wherein the flame retardant copolymer comprises: about 1 wt % to about 50 wt % of the phosphorus-based acrylic monomer; about 1 wt % to about 99 wt % of the (meth)acrylic monomer; and about 0 wt % to about 98 wt % of the reactive unsaturated monomer.

7. The (meth)acrylic flame retardant copolymer according to claim 1, wherein the (meth)acrylic flame retardant copolymer has a flame retardancy of V2 or more, as measured on a 3.2 mm thick specimen in accordance with UL94.

8. The (meth)acrylic flame retardant copolymer according to claim 1, wherein the (meth)acrylic flame retardant copolymer has a total light transmittance of about 85% or more, as evaluated on a 2.5 mm thick specimen in accordance with ASTM D1003.

9. The (meth)acrylic flame retardant copolymer according to claim 1, wherein the (meth)acrylic flame retardant copolymer has a weight average molecular weight of about 5,000 g/mol to about 500,000 g/mol.

10. A resin composition comprising the (meth)acrylic flame retardant copolymer according to claim 1.

11. The resin composition according to claim 10, further comprising: at least one additive selected from the group consisting of flame retardants, surfactants, nucleating agents, coupling agents, fillers, plasticizers, impact modifiers, lubricants, antibacterial agents, release agents, heat stabilizers, antioxidants, light stabilizers, compatibilizers, organic additives, colorants, stabilizers, lubricating agents, antistatic agents, pigments, dyes, fire-proofing agents, and mixtures thereof.

12. A molded article produced from the resin composition according to claim 11.

13. The (meth)acrylic flame retardant copolymer according to claim 1, wherein X is cyclohexyl, phenyl, methylphenyl, methylethylphenyl, propylphenyl, methoxyphenyl, cyclohexylphenyl, chlorophenyl, bromophenyl, phenylphenyl or benzylphenyl.

14. The resin composition according to claim 10, further comprising a polycarbonate resin, a polyethylene resin, a polystyrene resin, or a combination thereof.

* * * * *

UNITED STATES PATENT AND TRADEMARK OFFICE
CERTIFICATE OF CORRECTION

PATENT NO.       : 8,921,480 B2  
APPLICATION NO.  : 13/872240  
DATED            : December 30, 2014  
INVENTOR(S)      : Jin Hwa Chung et al.

Page 1 of 1

It is certified that error appears in the above-identified patent and that said Letters Patent is hereby corrected as shown below:

In the Claims

Claim 1, Column 11, Line 64 reads: "nyl, methoxyphenyl, cyclohexylphenyl, ~~chlorophenol~~," and should read: "nyl, methoxyphenyl, cyclohexylphenyl, chlorophenyl,"

Signed and Sealed this  
Sixteenth Day of June, 2015

Michelle K. Lee  
*Director of the United States Patent and Trademark Office*